US012803067B2

(12) United States Patent
Park et al.

(10) Patent No.: US 12,803,067 B2
(45) Date of Patent: Nov. 17, 2026

(54) CHARGING DEVICE AND METHOD FOR OPERATING SAME

(71) Applicants: HANA TECHNOLOGY CO., LTD., Yongin-si (KR); SK ON CO., LTD., Seoul (KR)

(72) Inventors: Kwan Sun Park, Suwon-si (KR); Byung Gil Yu, Gumi-si (KR)

(73) Assignees: HANA TECHNOLOGY CO., LTD., Yongin-si (KR); SK ON CO., LTD., Seoul (KR)

( * ) Notice: Subject to any disclaimer, the term of this patent is extended or adjusted under 35 U.S.C. 154(b) by 602 days.

(21) Appl. No.: 18/269,490

(22) PCT Filed: Jan. 27, 2023

(86) PCT No.: PCT/KR2023/001306
§ 371 (c)(1),
(2) Date: Jun. 23, 2023

(87) PCT Pub. No.: WO2023/149697
PCT Pub. Date: Aug. 10, 2023

(65) Prior Publication Data

US 2024/0372163 A1 Nov. 7, 2024

(30) Foreign Application Priority Data

Feb. 7, 2022 (KR) ........................ 10-2022-0015451

(51) Int. Cl.
*H01M 10/44* (2006.01)
*H02J 7/00* (2026.01)
*H02J 7/90* (2026.01)

(52) U.S. Cl.
CPC ......... *H01M 10/446* (2013.01); *H01M 10/44* (2013.01); *H02J 7/875* (2026.01); *H02J 7/927* (2026.01)

(58) Field of Classification Search
CPC .. H02J 7/927; H02J 7/00; H02J 7/875; H01M 10/44; H01M 10/446
See application file for complete search history.

(56) References Cited

U.S. PATENT DOCUMENTS 5,617,005 A * 4/1997 Brown, Jr. .............. H02J 7/927 320/132
5,998,968 A * 12/1999 Pittman .................. H02J 7/927 320/145
6,366,056 B1 * 4/2002 Podrazhansky ....... H01M 10/44 320/141

(Continued)

FOREIGN PATENT DOCUMENTS

CN 105684208 A 6/2016
CN 109390634 A 2/2019

(Continued)

*Primary Examiner* — Imran Akram
(74) *Attorney, Agent, or Firm* — Bridgeway IP Law Group, PLLC; Jihun Kim

(57) ABSTRACT

Provided is a method for operating a charging device, the method including the steps of supplying charge pulses for charging a secondary battery and supplying discharge pulses for discharging the secondary battery between the charge pulses while supplying the charge pulses, in which the charge pulses and the discharge pulses are alternately supplied from an activation start time point of the secondary battery.

13 Claims, 7 Drawing Sheets

(56) References Cited

U.S. PATENT DOCUMENTS

| | | | | |
|---|---|---|---|---|
| 2002/0070710 | A1* | 6/2002 | Yagi | B60L 50/60 320/150 |
| 2011/0057618 | A1* | 3/2011 | Izumi | B60K 6/28 320/129 |
| 2014/0123477 | A1 | 5/2014 | Safont Sempere et al. | |
| 2016/0149430 | A1* | 5/2016 | Hempel | H02J 7/00 320/139 |
| 2016/0254572 | A1* | 9/2016 | Yu | H01M 4/661 429/126 |
| 2017/0309952 | A1 | 10/2017 | Harayama et al. | |
| 2018/0062411 | A1* | 3/2018 | Yuan | H02J 7/00 |
| 2019/0140457 | A1* | 5/2019 | Dong | H01M 10/44 |
| 2019/0229537 | A1 | 7/2019 | Tkachenko et al. | |
| 2020/0028227 | A1* | 1/2020 | Mulder | C25B 1/04 |
| 2022/0001764 | A1* | 1/2022 | Lim | B60L 3/12 |
| 2022/0190619 | A1* | 6/2022 | Fasching | H02J 7/875 |
| 2022/0239136 | A1* | 7/2022 | Fasching | H02J 7/575 |
| 2022/0294037 | A1* | 9/2022 | Kim | H01M 10/052 |

FOREIGN PATENT DOCUMENTS

| | | | | | |
|---|---|---|---|---|---|
| CN | 110783528 | A | | 2/2020 | |
| CN | 112928351 | A | | 6/2021 | |
| GB | 2266016 | A | * | 10/1993 | H02J 7/96 |
| JP | 2000323188 | A | * | 11/2000 | |
| JP | 2002-125326 | A | | 4/2002 | |
| JP | 2002373646 | A | * | 12/2002 | |
| JP | 2010244981 | A | | 10/2010 | |
| JP | 2018-055901 | A | | 4/2018 | |
| JP | 6390902 | B2 | * | 9/2018 | H01M 10/0525 |
| KR | 10-2005-0041083 | A | | 5/2005 | |
| KR | 10-2009-0027901 | A | | 3/2009 | |
| KR | 10-2009-0059845 | A | | 6/2009 | |
| KR | 10-2016-0009049 | A | | 1/2016 | |
| KR | 10-2017-0103229 | A | | 9/2017 | |
| KR | 20170103229 | A | * | 9/2017 | H01M 10/446 |
| KR | 10-2468985 | B1 | | 11/2022 | |
| WO | 00/76049 | A1 | | 12/2000 | |
| WO | 2021077213 | A1 | | 4/2021 | |
| WO | WO-2021060811 | A1 | * | 4/2021 | H01M 4/386 |

* cited by examiner (a)

(b)

(c)

CHARGING DEVICE AND METHOD FOR OPERATING SAME

TECHNICAL FIELD

The present invention relates to a charging device and a method for operating the same, and more particularly, to a charging device that facilitates the formation of a solid electrolyte interphase (SEI) layer in a secondary battery of a discharged state and a method for operating the same.

BACKGROUND ART

In the production of electrical energy based on renewable energy sources, in particular photovoltaic power generation or wind power generation, there is a shift toward increasingly demanding for efficiently storing the generated energy in order to make available the stored electrical energy as much as needed when needed.

In general, lithium ion batteries, known as secondary batteries, have high numbers of charge cycles, long lifespans, and high storage capacities.

Lithium-ion batteries are discharged to 30% of their capacity depending on their design. That is, if the batteries are discharged at their threshold of 30% or less, since the lithium ion batteries are irreversibly damaged, the intrinsic energy 30% stored in the batteries is not utilized by the user. If the batteries are discharged at this threshold or less, ions may be separated from the electrode material (copper, A1), and an electrode may be destroyed because of this.

In order to produce and ship batteries such as lithium ion batteries, it is required to pass through several processes including an aging process, a formation process, an open circuit voltage (OCV) inspection process, an internal resistance (IR) inspection process, a grading process, and the like.

Among these processes, the formation process repeats the process of charging the produced 0 volt battery to a cell voltage of 4.2 V and discharging it to 2.7 V again several times to finally ship it to 3.7 V. Therefore, since the characteristics and quality of the battery are determined in this process, the formation process is a very important process for determining the quality of the battery.

However, during the formation process, a lithium ion battery is charged to only 80% of its capacity, and the reason is that when the end-of-charge voltage is reached, the current is normally limited. Therefore, since the remaining 20% of the capacity is charged at less amperage so that less energy is stored or built up into the battery in terms of time, there is a problem in that it takes exponentially more time for the battery to charge to 100%.

DISCLOSURE

Technical Problem

An object of the present invention is to provide a charging device that facilitates the formation of a solid electrolyte interphase (SEI) layer in a secondary battery of a discharged state and a method for operating the same.

The objects of the present invention are not limited to the above-mentioned object, and other objects and advantages of the present invention not mentioned above can be understood by the following description and will be more clearly understood by exemplary embodiments of the present invention. It will also be readily apparent that the objects and advantages of the present invention may be realized by means of the instrumentalities and combinations indicated in the claims.

Technical Solution

A method for operating a charging device according to the present invention includes the steps of supplying charge pulses for charging a secondary battery and supplying discharge pulses for discharging the secondary battery between the charge pulses while supplying the charge pulses, in which the charge pulses and the discharge pulses may be alternately supplied from an activation start time point of the secondary battery.

The activation start time point may be a time point when a first charge pulse among the charge pulses is supplied in order to start forming a solid electrolyte interphase (SEI) layer in a discharged state of the secondary battery.

The charge pulses may have a charging current of 1 to 3 times the rated current of the secondary battery.

The charge pulses may have a charge holding time of 20 ms to 100 ms.

The discharge pulses may have a discharging current of 0.2 to 0.5 times the rated current of the secondary battery.

The discharge pulses may have a discharge holding time of 5 ms to 30 ms.

The charge pulses may have a charge holding time of 1.5 to 5 times the discharge holding time of the discharge pulses.

The charge holding time of the charge pulses may be the shortest when the charging current of the charge pulses is 3 times the rated current of the secondary battery, and the longest when the charging current of the charge pulses is 1 times the rated current of the secondary battery, and the discharge holding time of the discharge pulses may be the shortest when the discharging current of the discharge pulses is 0.5 times the rated current of the secondary battery, and the longest when the discharging current of the discharge pulses is 0.2 times the rated current of the secondary battery.

The discharge pulses may each have a discharge amount of 0.04 to 0.16 times the charge amount of each of the charge pulses.

A charging device according to the present invention may include an input module for inputting rated capacity information of a secondary battery and an activation start command of the secondary battery, a charge/discharge module for supplying charge pulses for charging the secondary battery and discharge pulses for discharging the secondary battery between the charge pulses, and a control module for setting a charging current of the charge pulses and a discharging current of the discharge pulses depending on the rated capacity information and controlling the charge/discharge module so that the charge pulses and the discharge pulses are alternately supplied to the secondary battery from an activation start time point when the activation start command is input.

The activation start time point may be a time point when a first charge pulse among the charge pulses is supplied in order to start forming a solid electrolyte interphase (SEI) layer in a discharged state of the secondary battery.

Advantageous Effects

The charging device according to the present invention and a method for operating the same have advantages in that the lifespan and capacity of the secondary battery can be increased by alternately supplying charge pulses and discharge pulses, which are up to three times higher than the rated current of the secondary battery for a very short time, in order to start the formation of a solid electrolyte interphase (SEI) layer in the discharged state of the secondary battery.

Meanwhile, the effects of the present invention are not limited to the effects mentioned above, and various effects may be included within a range apparent to one of ordinary skill in the art from the contents to be described below.

MODE FOR CARRYING OUT THE INVENTION

Figure 1:
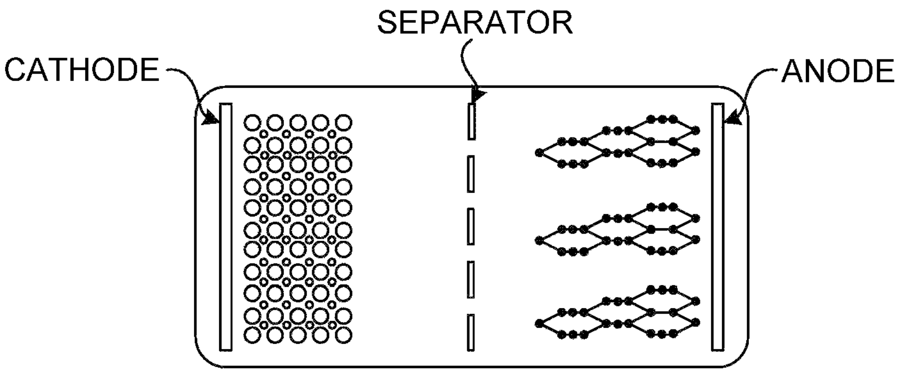
FIG. 1 is views showing a formation process of a lithium secondary battery according to the present invention.
Figure 1:
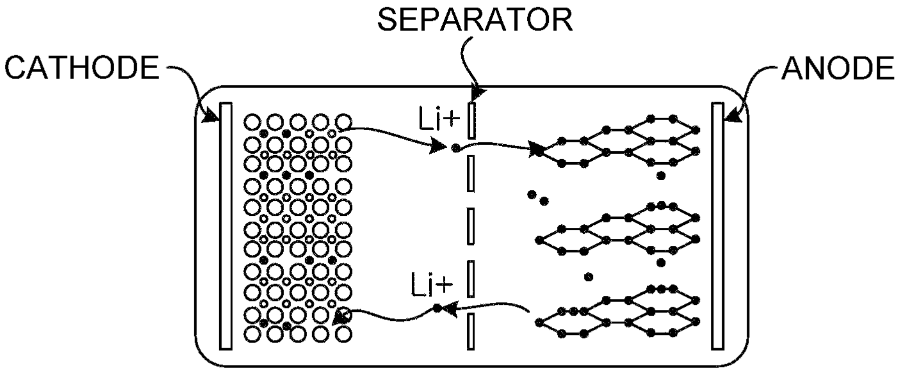
Figure 1:
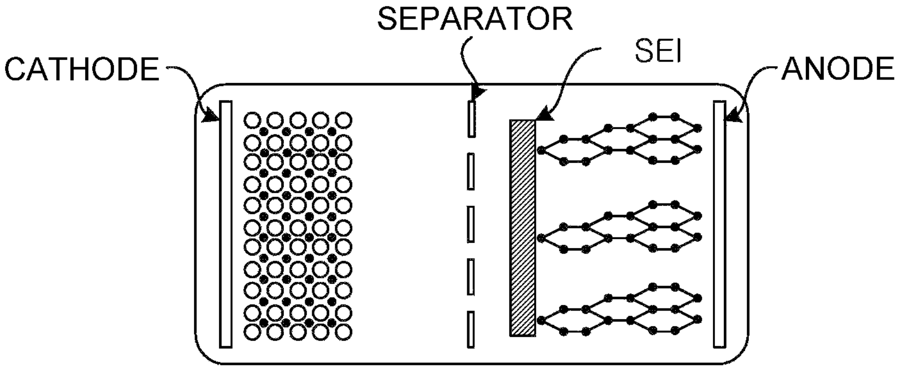

Since the present invention can make various changes and have various exemplary embodiments, specific exemplary embodiments will be illustrated in the drawings and described in detail. However, this is not intended to limit the present invention to the specific embodiments, and should be understood to include all modifications, equivalents, or substitutes included in the spirit and technical scope of the present invention. Similar reference numerals have been used for similar elements while describing each of the drawings.

Terms such as first, second, A, and B may be used in describing various elements, but the elements should not be limited by the terms. The terms are used only for the purpose of distinguishing one element from another. For example, a first element may be termed a second element, and similarly, a second element may also be termed a first element, without departing from the scope of the present invention. A term and/or includes a combination of a plurality of related described items or any one of a plurality of related described items.

It should be understood that when an element is referred to as being “connected” or “coupled” to another element, it may be directly connected or coupled to another element, but another element may exist in the middle therebetween. Meanwhile, it should be understood that when an element is referred to as “directly connected” or “directly coupled” to another element, another element does not exist in the middle therebetween.

Terms used in this application are only used to describe specific exemplary embodiments, and are not intended to limit the present invention. Expressions in the singular number include plural expressions unless the context clearly dictates otherwise. In this application, it should be understood that the term “include”, “have”, or the like is intended to designate that a feature, number, step, operation, component, part, or combination thereof described in the specification exists, but it does not preclude in advance the possibility of the presence or addition of one or more other features, numbers, steps, operations, components, parts, or combinations thereof.

Unless defined otherwise, all terms used herein, including technical or scientific terms, have the same meaning as commonly understood by one of ordinary skill in the art to which the present invention belongs. Terms such as those defined in commonly used dictionaries should be interpreted as having a meaning consistent with the meaning in the context of the related art, and unless explicitly defined in this application, it is not interpreted in an ideal or excessively formal meaning.

Hereinafter, preferred exemplary embodiments according to the present invention will be described in detail with reference to the accompanying drawings.

FIG. 1 is views showing a formation process of a lithium secondary battery according to the present invention.

FIG. 1A is a state that does not have electrical characteristics after the lithium secondary battery is manufactured, FIG. 1B is a formation process, and a state in which the formation of a solid electrolyte interphase (SEI) layer is started so as to have electrical characteristics in the lithium secondary battery, and FIG. 1C shows a lithium secondary battery having electrical characteristics after the formation process is completed.

Here, the solid electrolyte interphase (SEI) layer is an important factor determining the electric capacity, performance, and lifespan of a lithium secondary battery.

That is, in FIG. 1B, in order to activate the lithium secondary battery, charge pulses and discharge pulses may be alternately supplied to the cathode and the anode so that a solid electrolyte interphase (SEI) layer may be generated on the anode side.

Here, the solid electrolyte interphase (SEI) layer may prevent lithium ions ($Li^+$) from reacting with other materials at the anode when the lithium secondary battery is later charged.

Further, the solid electrolyte interphase (SEI) layer may perform a kind of ion tunneling function, and may pass only lithium ions ($Li^+$).

That is, the solid electrolyte interphase (SEI) layer may be formed in a process of activating a cell in a discharged state by a formation process, that is, an initial charging process of a lithium secondary battery.

First, when charge pulses are supplied to the lithium secondary battery during charging of the lithium secondary battery, lithium ions ($Li^+$) may pass from the cathode of the lithium secondary battery to the anode, and they may react with additives in the anode electrolyte to form a thin solid electrolyte interphase (SEI) layer on the front side of the anode interface.

That is, the solid electrolyte interphase (SEI) layer is a nonconductor formed when the amount of ion movement of the battery increases, and once formed, it may prevent lithium ions ($Li^+$) from reacting with other materials at the anode during battery charging later.

Figure 2:
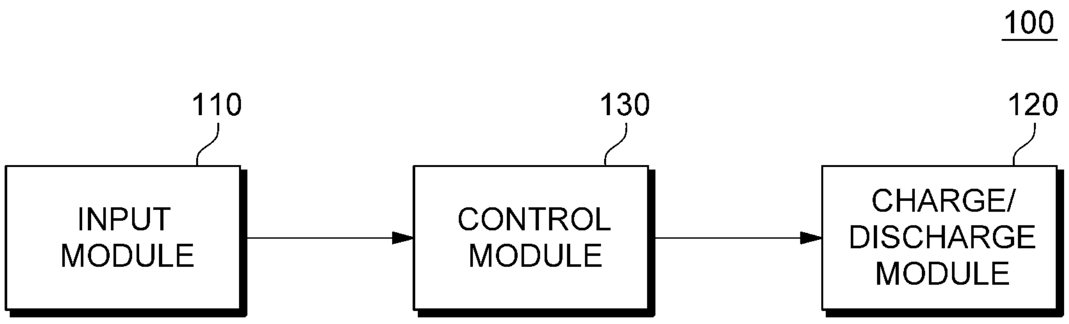
FIG. 2 is a control block diagram showing a control configuration of a charging device according to the present invention.
Figure 3:
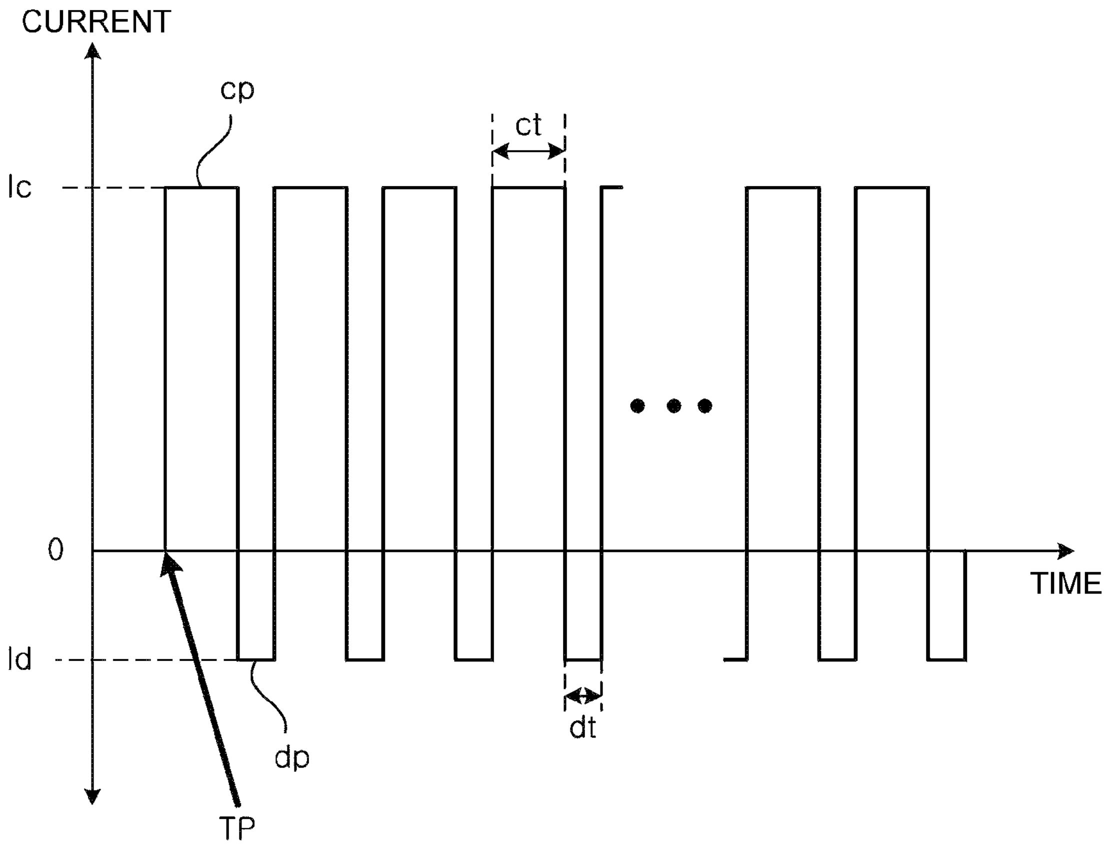
FIG. 3 is a timing diagram showing charge pulses and discharge pulses output from the charging device according to the present invention.

FIG. 2 is a control block diagram showing a control configuration of a charging device according to the present invention and FIG. 3 is a timing diagram showing charge pulses and discharge pulses output from the charging device according to the present invention.

Referring to FIGS. 2 and 3, the charging device 100 may include an input module 110, a charge/discharge module 120, and a control module 130.

In the exemplary embodiment, the charging device 100 is described as being applied to a formation process for activating a secondary battery, for example, a lithium secondary battery, but is not limited thereto.

The input module 110 may input rated capacity information of a secondary battery having no electrical characteristics and an activation start command of the secondary battery.

First, the rated capacity information of the secondary battery may include at least one of a maximum charging capacity and a rated current of the secondary battery, but is not limited thereto.

Here, the activation start command may be a command to start initial charging and discharging of the secondary battery.

As a result, the input module 110 may input the activation start command for starting the formation of a solid electrolyte interphase (SEI) layer in the discharged state of the secondary battery.

The charge/discharge module 120 may supply charge pulses cp for charging the secondary battery and discharge pulses dp for discharging the secondary battery depending on the control of the control module 130.

The control module 130 may set the charging current Ic of the charge pulses cp and the discharging current Id of the discharge pulses dp depending on the rated capacity information.

Thereafter, when the activation start command is input, the control module 130 may control the charge/discharge module 120 so that high current charge pulses cp and discharge pulses dp are alternately supplied from the activation start time point TP to the secondary battery.

Here, the control module 130 may set and determine the charging current Ic and the discharging current Id based on the rated current.

First, the charging current Ic may be 1 to 3 times the rated current, and when it is less than 1 times the rated current, the charging time of the secondary battery may become longer, and when it is greater than 3 times the rated current, the charging time of the secondary battery may become shorter, but salt reaction may occur due to overcharging.

Further, the discharging current Id may be 0.2 to 0.5 times the rated current, and when it is less than 0.2 times the rated current, the discharging time of the secondary battery may become longer, and when it is greater than 0.5 times the rated current, the discharging time of the secondary battery may become shorter, but salt may be generated due to overcharging.

At this time, the control module 130 may determine the charge holding time ct depending on the charging current Ic.

For example, when the charging current Ic is 3 times the rated current, the charge holding time ct of the charging current Ic may be maintained longer than when the charging current Ic is 1 time the rated current.

The charge holding time ct of the charging current Ic may be 20 ms to 100 ms, and if it is faster than 20 ms, the charging current Ic may be more than 3 times the rated current, resulting in overcharging, and if it is longer than 100 ms, the charging time may be longer since the charging current Ic is less than 1 times the rated current.

Further, the control module 130 may determine the discharge holding time dt depending on the discharging current Id.

For example, when the discharging current Id is 0.5 times the rated current, the discharge holding time dt of the discharging current Id may be maintained shorter than when the discharging current Id is 0.2 times the rated current.

The discharge holding time dt of the discharging current Id may be 5 ms to 30 ms, if it is faster than 5 ms, the discharge effect by the discharging current Id may be lowered, and if it is longer than 30 ms, the discharge time of the discharging current Id may be longer.

Further, the charge holding time ct of the charge pulses cp may be 1.5 to 5 times the discharge holding time dt of the discharge pulses dp, but is not limited thereto.

Also, the discharge amount of each of the discharge pulses dp may be 0.04 to 0.16 times the charge amount of each of the charge pulses cp.

Here, the charging amount and the discharging amount may be determined by current and holding time, and may be adjusted depending on the rated capacity of the secondary battery, but are not limited thereto.

As such, the charging device 100 sequentially supplies charge pulses cp and discharge pulses dp to the secondary battery having no electrical characteristics so that the solid electrolyte interphase (SEI) layer may be formed in the secondary battery to have the electrical characteristics of the secondary battery.

Further, the charging device 100 supplies high-current charge pulses cp and discharge pulses dp within a very short time so that endothermic and exothermic reactions may be lowered, salt generation due to overcharging may be lowered, and the solid electrolyte interphase formed on the anode surface may be thickened to increase the lifespan.

FIGS. 4 to 7 are timing diagrams showing charge pulses and discharge pulses output from the charging device according to various exemplary embodiments of the present invention.

Figure 4:
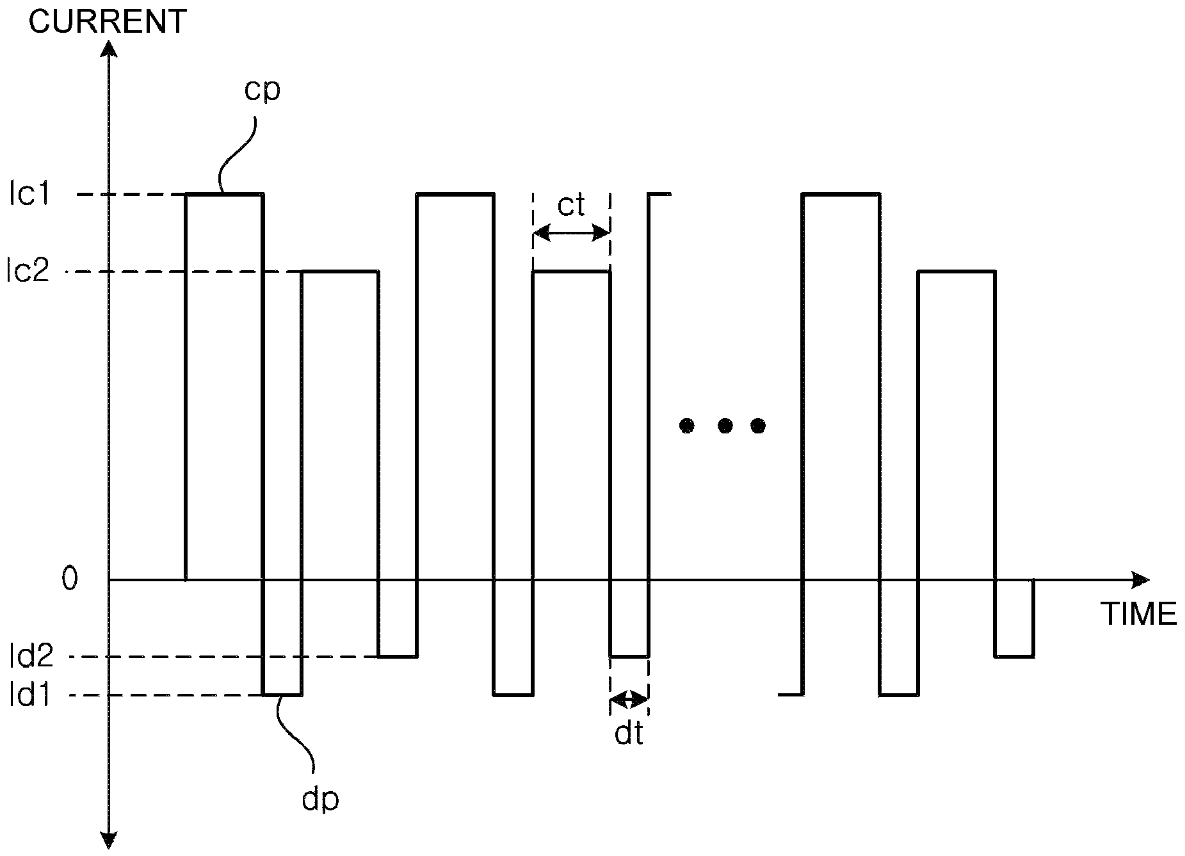
FIGS. 4 to 7 are timing diagrams showing charge pulses and discharge pulses output from the charging device according to various exemplary embodiments of the present invention.

First, the charge pulses cp and discharge pulses dp shown in FIG. 4 have pulse shapes different from those of the charge pulses cp and discharge pulses dp shown in FIG. 3.

Here, the charge pulses cp may have different current sizes as a first charging current Ic1 and a second charging current Ic2, and may be alternately supplied to the secondary battery.

In this case, the first and second charging currents Ic1 and Ic2 may be determined between 1 and 3 times the rated current of the secondary battery as described in FIGS. 2 and 3.

Further, the discharge pulses dp may have different current sizes as a first discharging current Id1 and a second discharging current Id2, and may be alternately supplied to the secondary battery.

As described in FIGS. 2 and 3, the first and second discharging currents Id1 and Id2 may be determined between 0.2 and 0.5 times the rated current of the secondary battery, and may vary depending on the first and second charging currents Ic1 and Ic2, but are not limited thereto.

Figure 5:
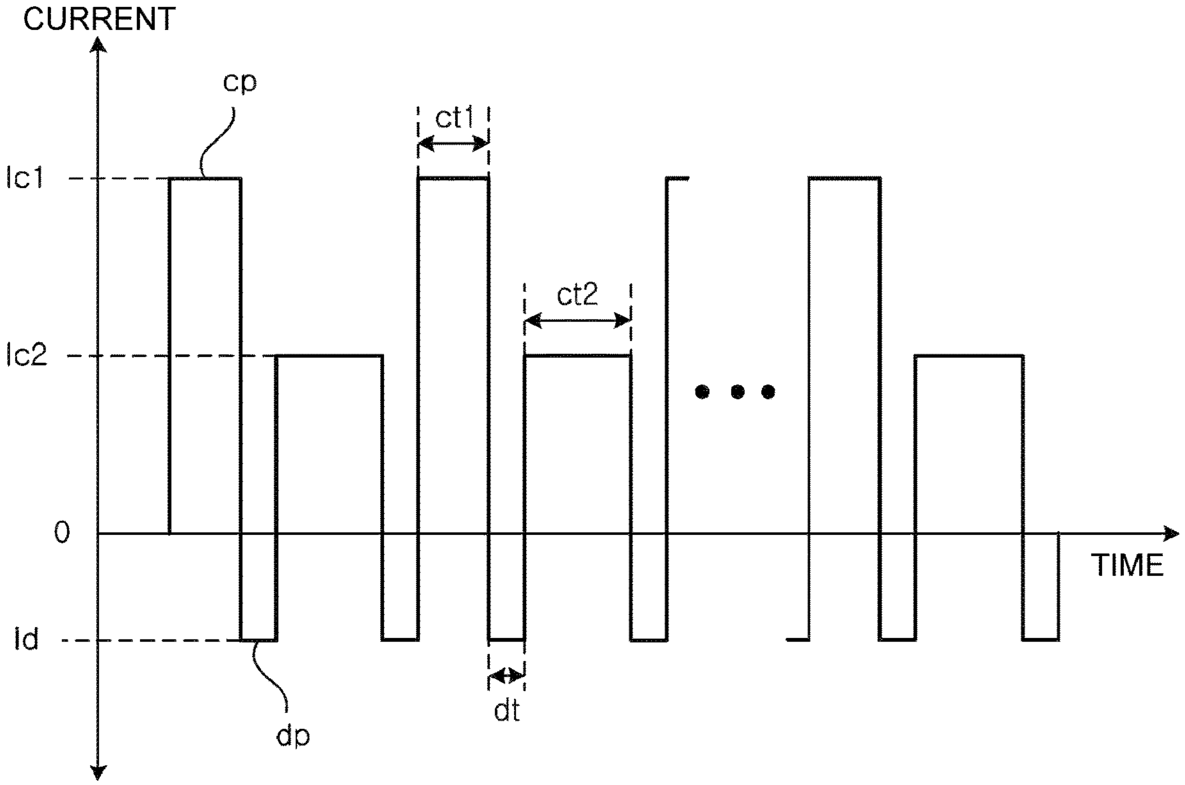

The charge pulses cp and discharge pulses dp shown in FIG. 5 have pulse shapes different from those of the charge pulses cp and discharge pulses dp shown in FIG. 3.

The charge pulses cp may have different current sizes as a first charging current Ic1 and a second charging current Ic2, and may be alternately supplied to the secondary battery.

In this case, the first and second charging currents Ic1 and Ic2 may be determined between 1 and 3 times the rated current of the secondary battery as described in FIGS. 2 and 3.

At this time, the charge holding time ct1 of the charge pulses cp having the first charging current Ic1 may be shorter than the charge holding time ct2 of the charge pulses cp having the second charging current Ic2.

The charge holding times ct1 and ct2 of the charge pulses cp having the first and second charging currents Ic1 and ic2 may be considered to be adjusted to make the respective charging amounts of the charge pulses cp the same.

Accordingly, the discharging current Id and the discharge holding time dt of the discharge pulses dp may be maintained the same as those of the discharge pulses dp shown in FIG. 3.

In FIG. 5, it has been described that the charge pulses cp vary, but the discharge pulses dp may vary, and is not limited thereto.

Figure 6:
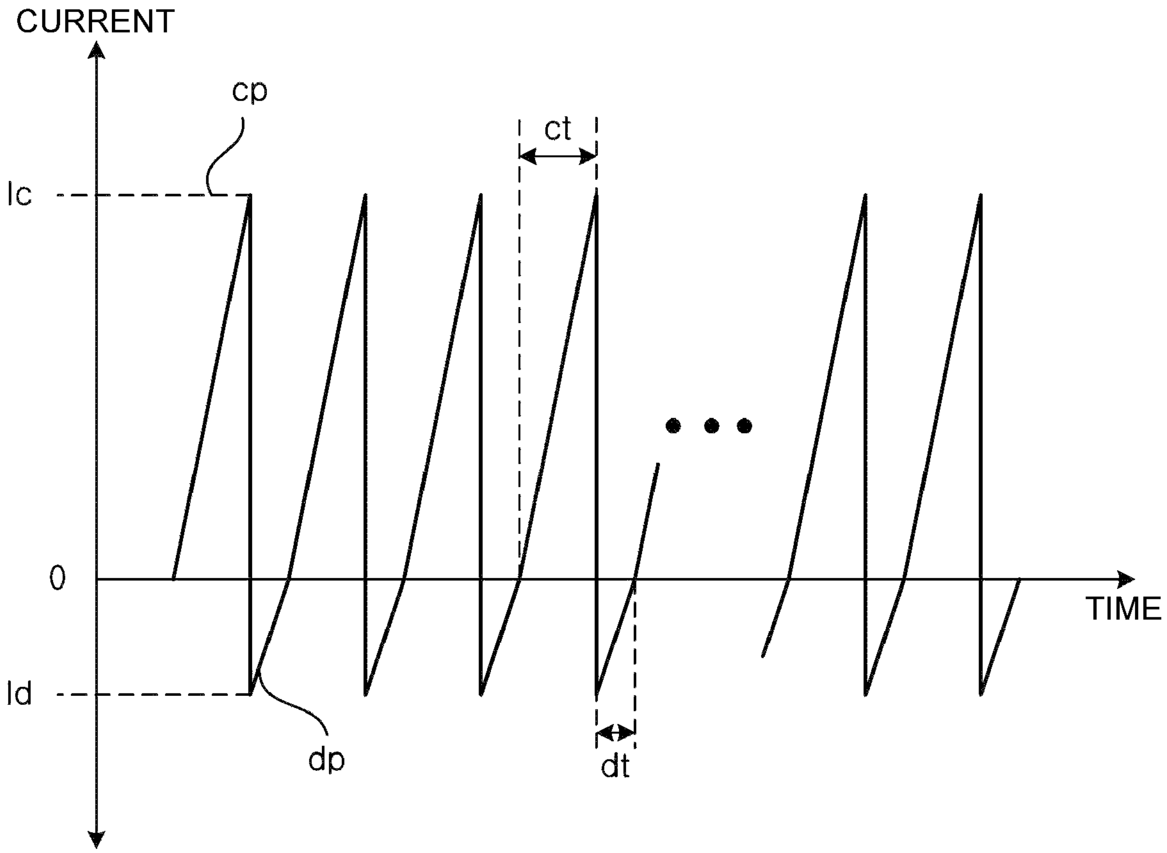

The charge pulses cp and discharge pulses dp shown in FIG. 6 have pulse shapes different from those of the charge pulses cp and discharge pulses dp shown in FIG. 4.

It can be seen that the charge pulses cp gradually increase until the first charging current Ic1, and the discharge pulses dp gradually decrease at the second charging current Id.

Although the charge pulses cp and discharge pulses dp shown in FIG. 6 are shown to increase or decrease gradually, since the charge holding time ct and the discharge holding time dt are very short, the charge pulses cp and discharge pulses dp may have the effect shown in FIG. 5 with respect to charging and discharging.

Figure 7:
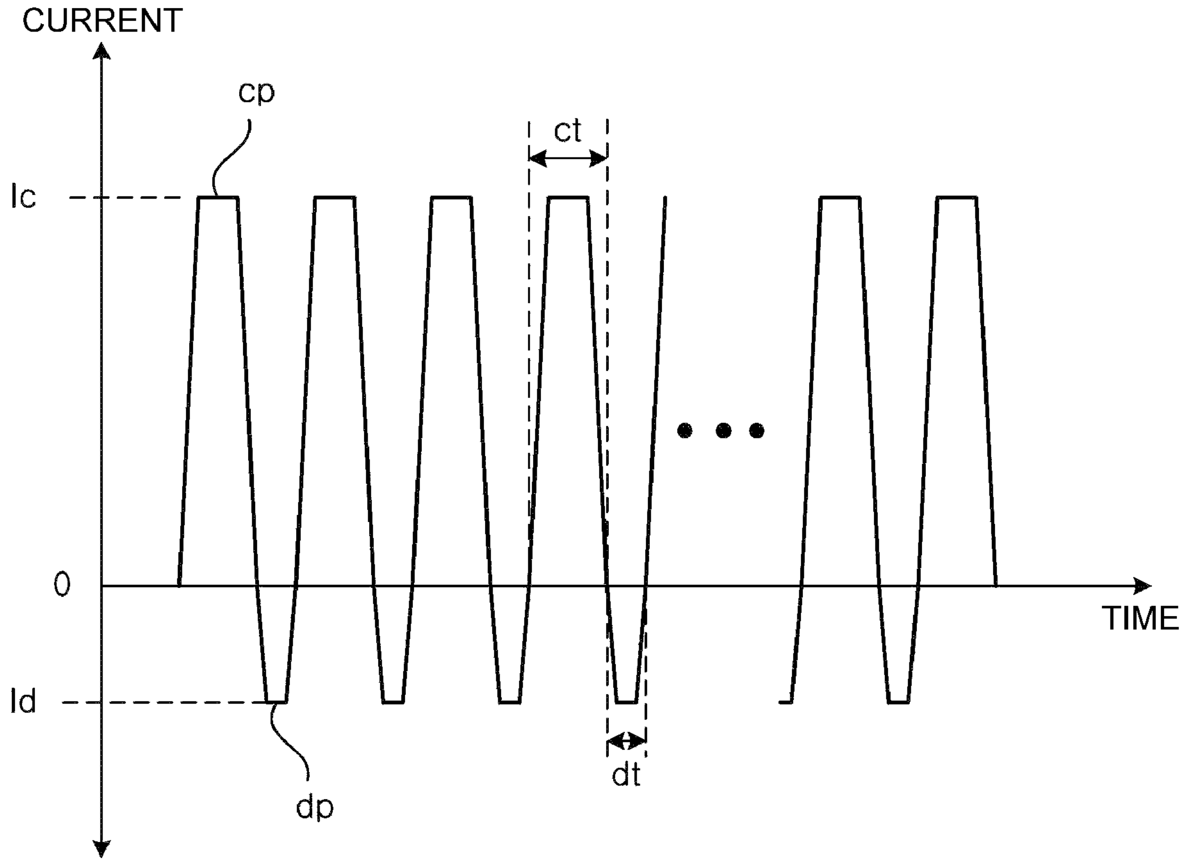

The charge pulses cp and discharge pulses dp shown in FIG. 7 have pulse shapes different from those of the charge pulses cp and discharge pulses dp shown in FIG. 3.

The charge pulses cp and discharge pulses dp shown in FIG. 7 have trapezoidal shapes differently from those of FIG. 3, but may have the charging and discharging effects as shown in FIG. 3.

Figure 8:
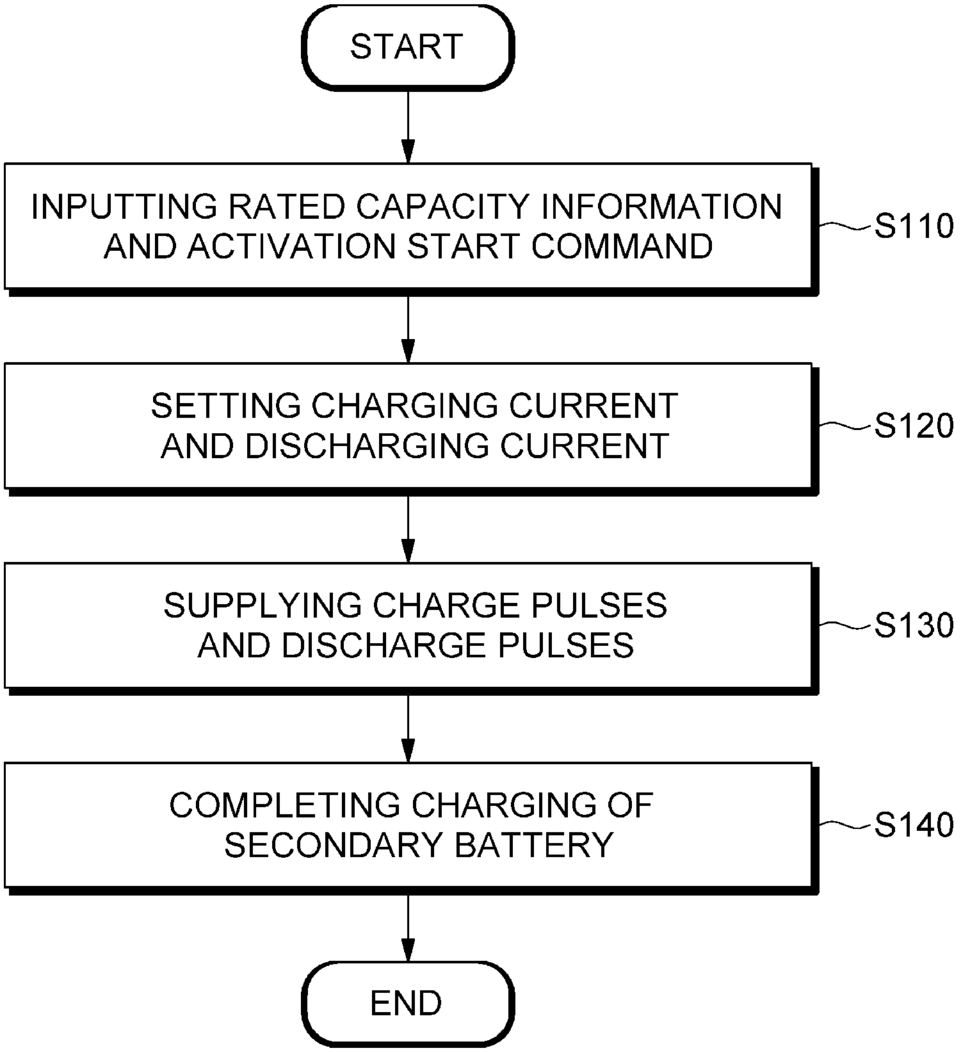
FIG. 8 is a flowchart showing a method for operating the charging device according to the present invention.

FIG. 8 is a flowchart showing a method for operating the charging device according to the present invention.

Referring to FIG. 8, the charging device 100 may have rated capacity information and activation start command of the secondary battery input thereinto (S110).

The charging device 100 may set the charging current Ic of the charge pulses cp and the discharging current Id of the discharge pulses dp depending on the rated capacity information (S120).

That is, the control module 130 of the charging device 100 may set the charging current Ic of the charge pulses cp and the discharging current Id of the discharge pulses dp depending on the rated capacity information.

The rated capacity information of the secondary battery may include at least one of a maximum charging capacity and a rated current of the secondary battery, but is not limited thereto.

The control module 130 may set and determine the charging current Ic and the discharging current Id based on the rated current. In addition, the control module 130 may determine a charge holding time ct depending on the charging current Ic and a discharge holding time dt depending on the discharging current Id.

The charging device 100 may alternately supply charge pulses cp and discharge pulses dp depending on the activation start command (S130).

That is, the control module 130 sequentially supplies charge pulses cp and discharge pulses dp to the secondary battery having no electrical characteristics so that the solid electrolyte interphase (SEI) layer may be formed in the secondary battery to have the electrical characteristics of the secondary battery.

When charging of the secondary battery is completed, the charging device 100 may cut off supply of the charge pulses cp and the discharge pulses dp (S140).

Features, structures, effects, etc. described in the exemplary embodiments above are included in at least one exemplary embodiment of the present invention, and are not necessarily limited to only one exemplary embodiment. Furthermore, the features, structures, effects, etc. illustrated in each exemplary embodiment can be implemented by being combined or modified even with respect to other exemplary embodiments by one of ordinary skill in the art to which the exemplary embodiments belong. Therefore, contents related to these combinations and modifications should be construed as being included in the scope of the present invention.

In addition, although the above description has been described with reference to the exemplary embodiments, these are only examples and do not limit the present invention, and those of ordinary skill in the art to which the present invention pertains will know that various modifications and applications not exemplified above are possible without departing from the essential characteristics of the present embodiment. For example, each component specifically shown in the exemplary embodiment can be modified and implemented. In addition, the differences related to these modifications and applications should be construed as being included in the scope of the present invention as defined in the appended claims.

The invention claimed is:

1. A method for operating a charging device, the method comprising:

supplying charge pulses for charging a newly manufactured lithium secondary battery having no electrical characteristic; and supplying discharge pulses for discharging the newly manufactured lithium secondary battery between the charge pulses while supplying the charge pulses, wherein the charge pulses and the discharge pulses are alternately supplied from an activation start time point of the newly manufactured lithium secondary battery, wherein the charge pulses have a charge holding time of 20 ms to 100 ms, or the discharge pulses have a discharge holding time of 5 ms to 30 ms, wherein a charging current of the charge pulses is greater than a discharging current of the discharge pulses, and wherein the activation start time point is a time point when a first charge pulse among the charge pulses is supplied in order to start forming a solid electrolyte interphase (SEI) layer in a discharged state of the newly manufactured lithium secondary battery.

2. The method of claim 1, wherein the charge pulses have the charging current of 1 to 3 times a rated current of the newly manufactured lithium secondary battery.

3. The method of claim 1, wherein the discharge pulses have the discharging current of 0.2 to 0.5 times a rated current of the newly manufactured lithium secondary battery.

4. The method of claim 1, wherein the charge pulses have a charge holding time of 1.5 to 5 times a discharge holding time of the discharge pulses.

5. The method of claim 1, wherein a charge holding time of the charge pulses is shortest when the charging current of the charge pulses is 3 times a rated current of the newly manufactured lithium secondary battery, and longest when the charging current of the charge pulses is 1 times the rated current of the newly manufactured lithium secondary battery, and a discharge holding time of the discharge pulses is shortest when the discharging current of the discharge pulses is 0.5 times the rated current of the newly manufactured lithium secondary battery, and longest when the discharging current of the discharge pulses is 0.2 times the rated current of the newly manufactured lithium secondary battery.

6. The method of claim 1, wherein the discharge pulses each have a discharge amount of 0.04 to 0.16 times a charge amount of each of the charge pulses.

7. A method for performing an initial formation process of a lithium secondary battery in a 0 V state, the method comprising:

supplying a first charge pulse to the lithium secondary battery at an activation start time point of the initial formation process; and from the activation start time point, alternately supplying charge pulses and discharge pulses to the lithium secondary battery, each discharge pulse being supplied after an immediately preceding charge pulse and before a next charge pulse, wherein the charge pulses have a charge holding time of 20 ms to 100 ms, or the discharge pulses have a discharge holding time of 5 ms to 30 ms, wherein the first charge pulse is a first pulse supplied to the lithium secondary battery during the initial formation process, and wherein the each discharge pulse has a discharge amount of 0.04 to 0.16 times a charge amount of the immediately preceding charge pulse.

8. The method of claim 7, wherein the charge pulses have a charging current of 1 to 3 times a rated current of the lithium secondary battery.

9. The method of claim 7, wherein the discharge pulses have a discharging current of 0.2 to 0.5 times a rated current of the lithium secondary battery.

10. The method of claim 7, wherein the charge pulses have a charge holding time of 1.5 to 5 times a discharge holding time of the discharge pulses.

11. The method of claim 7, wherein the charge pulses comprise a higher-current charge pulse having a first charging current and a first charge holding time, and a lower-current charge pulse having a second charging current lower than the first charging current and a second charge holding time longer than the first charge holding time, and wherein a product of the first charging current and the first charge holding time is equal to a product of the second charging current and the second charge holding time.

12. The method of claim 7, wherein each of the charge pulses and the discharge pulses has a trapezoidal waveform.

13. The method of claim 7, wherein each charge pulse gradually increases to a charging current and each discharge pulse gradually decreases to a discharging current.

* * * * *